United States Patent [19]

Zurit et al.

[11] 4,035,893
[45] July 19, 1977

[54] METHOD OF MAKING BEER DISTRIBUTING EQUIPMENT AND PRODUCT OBTAINED

[75] Inventors: David Zurit, Tenafly, N.J.; Frank Sciara, Floral Park, N.Y.

[73] Assignee: Vending Components, Inc., Hackensack, N.J.

[21] Appl. No.: 571,552

[22] Filed: Apr. 25, 1975

Related U.S. Application Data

[62] Division of Ser. No. 411,238, Oct. 31, 1973, abandoned.

[51] Int. Cl.$^2$ .................... B23P 15/00; B23P 13/02
[52] U.S. Cl. .................... 29/157 R; 29/558; 137/322; 222/400.7
[58] Field of Search .......... 29/157 R, 157 C, 417, 29/558, 559; 408/1; 137/322, 323, 320, 321, 317, 318; 222/400.7, 399; 82/1 C, 19

[56] References Cited

U.S. PATENT DOCUMENTS

| | | | |
|---|---|---|---|
| 1,203,982 | 11/1916 | Collette | 29/157 R |
| 1,851,031 | 3/1932 | Baldwin, Jr. | 29/157 R |
| 2,305,475 | 12/1942 | Jagersberger et al. | 29/557 |
| 2,646,614 | 7/1953 | Staley | 29/157 R |
| 3,065,885 | 11/1962 | Chattan | 137/322 |
| 3,228,413 | 1/1966 | Stevens, Jr. | 137/322 |
| 3,596,809 | 8/1971 | Taubenheim | 222/400.7 |
| 3,698,417 | 10/1972 | Smith et al. | 222/400.7 |

*Primary Examiner*—Charlie T. Moon
*Assistant Examiner*—Daniel C. Crane
*Attorney, Agent, or Firm*—Roy C. Hopgood; John M. Calimafde; Eugene J. Kalil

[57] ABSTRACT

This invention is for two probe hose connector fittings for tapping beer kegs that have a keg fitting with check valves for preventing flow of beer and gas until the probes are pushed down into position to open at least the beer valve. The probes are tubes, and in the prior art such tubes were cut diagonally across their lower end portions to form a valve engaging surface. This surface at the lower end of the tube was merely the end face of a part of the circumference of the tube and easily damaged because of its lack of inherent strength. The present invention makes the probes from bar stock and provides a construction that provides ample open area over part of its cross section for the flow of beer.

4 Claims, 10 Drawing Figures

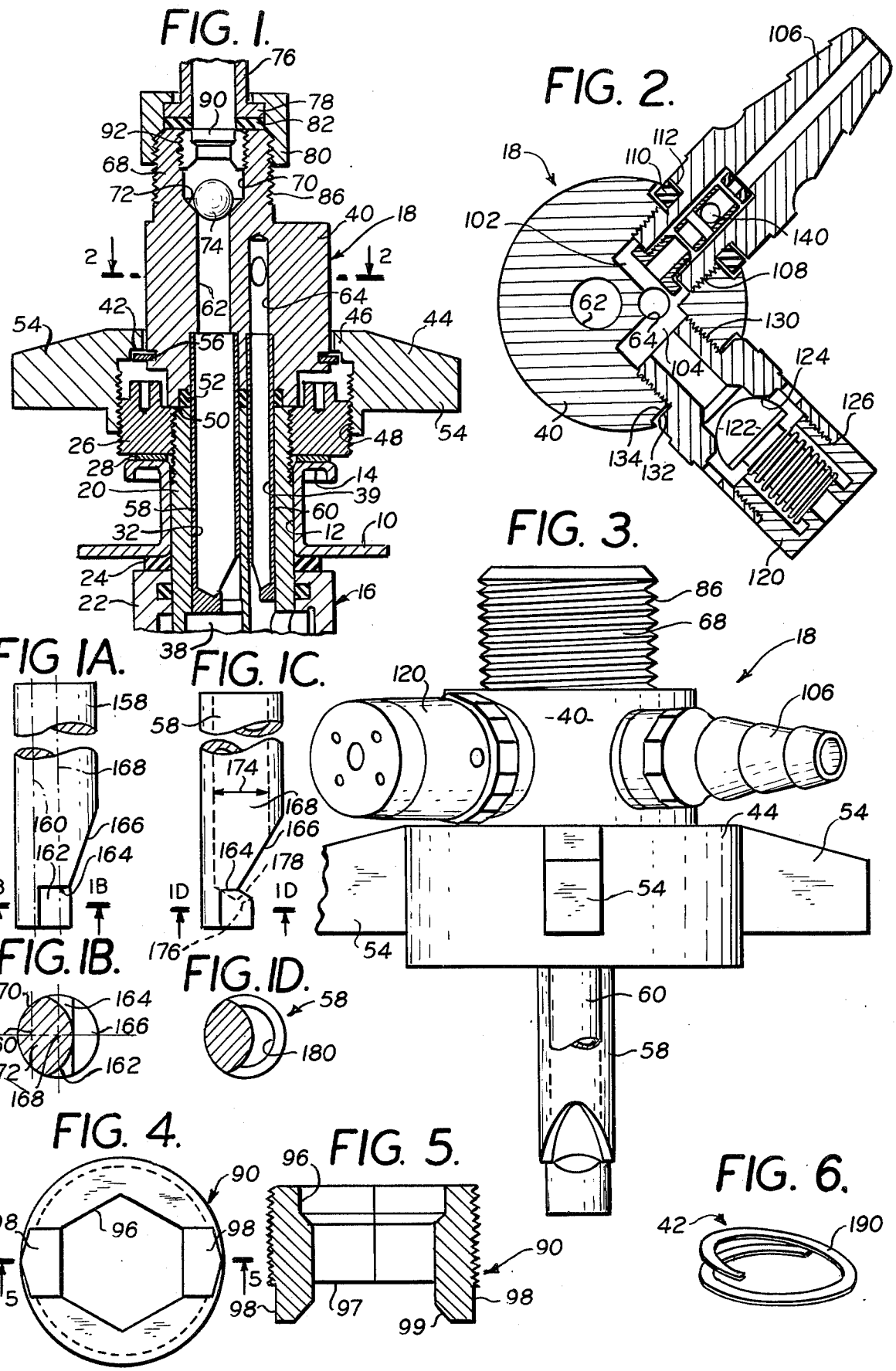

METHOD OF MAKING BEER DISTRIBUTING EQUIPMENT AND PRODUCT OBTAINED

RELATED APPLICATION

This application is a division of our co-pending application Ser. No. 411,238, filed Oct. 31, 1973, now abandoned.

BACKGROUND AND SUMMARY OF THE INVENTION

A popular type of tapping equipment for beer kegs and the like has a keg fitting permanently secured to the keg and passing through the discharge opening of the keg. Valves in the keg fitting prevent escape of beer and air or gas. The keg fitting has a passage for liquid and another passage for gas. The hose connector fitting by which the keg is attached to the distributing system in a tavern has two prongs which slide down in the liquid passage and gas passage to open the check valve for the liquid passage and in some systems to also open the check valve in the gas passage. The hose connector fitting, sometimes referred to as the "tavern fitting", is connected with the keg fitting by a flanged nut which bears against a shoulder on the hose connector fitting and which screws down on a threaded cylindrical surface of the keg fitting. The hose is connected with the upper end of the hose connector fitting by a screwed connection, usually concentric with the flanged nut that holds the fittings together. This means that the eccentric liquid passage through the keg fitting cannot be in alignment with the axis of the screw connection at the upper end of the hose connector fitting unless there is an offset somewhere along the liquid passage.

This invention is constructed so that the liquid passage is straight and in axial alignment with the liquid probe all the way to the top of the beer connector fitting. Alignment with the hose connection which is screwed over the upper end of the beer connector fitting is obtained by having the upper portion of the beer connector fitting eccentric with respect to the axis of the keg fitting and located so as to be coaxial with the liquid passage through the beer connector fitting.

This not only provides for better flow and cleaning of the hose connector fitting, but more importantly it provides space for a counterbore in the upper end of the hose connector fitting so that a check valve can be located in the passage to prevent back flow of beer when changing the hose connector fitting from one keg to another. It also provides space for a retainer for the check valve, all without increasing the height of the fitting or increasing its cost as would result from larger size and more material.

Another important feature of this invention is the construction of the probes so that the lower ends of the probes are substantially thicker than the walls of the tubular portions of the probe. This makes the lower ends of the probes stronger so that they are not easily damaged in case they are dropped. Probes of the prior art have been subject to damage because they have been constructed by merely cutting away a portion of a tube wall to form the contact area at the bottom of the probe which extends into the check valve space of the keg fitting.

The hose connector fitting of this invention provides branch passages from the gas passage which communicates with the keg. In one of the branch passages there is located a connection for a hose to the source of gas pressure; and in the other branch passage there is provision for connecting a pressure relief valve to the gas passage.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a sectional view through a hose connector system made in accordance with this invention and shown connected with a fixed keg fitting that is permanently secured to a keg with which the hose connector fitting is intended to be used;

FIG. 1A is an enlarged view of a partially manufactured probe for the hose connector fitting of this invention;

FIG 1B is a sectional view taken on the line 1B—1B of FIG. 1A;

FIG. 1C shows the partially manufactured probe of FIGS. 1A and 1B after it has been completed;

FIG. 1D is a sectional view on the line 1D—1D of FIG. 1C;

FIG. 2 is a sectional view taken on the line 2—2 of FIG. 1;

FIG. 3 is a side elevation of the hose connector system shown in FIGS. 1 and 2, the view being taken from the right side and looking toward the left in FIG. 2;

FIG. 4 is a detail view showing the retainer of FIG. 1 on a larger scale;

FIG. 5 is a sectional view taken on the line 5—5 of FIG. 4; and

FIG. 6 is a perspective view of the ring or shoulder for contact with the nut that connects the hose connector fitting to the keg fitting.

DESCRIPTION OF PREFERRED EMBODIMENT

FIG. 1 shows an upper side 10 of a beer keg or barrell with an opening 12 having outer flange 14. This is a conventional beer keg construction, and the opening 12 must be closed by means capable of withstanding the internal pressure within the keg 10. One popular type of keg tapping equipment includes a keg fitting 16 which is permanently connected to the beer keg and constructed in such a way as to prevent flow of beer or gas from the keg except when the keg fitting is attached to a hose connector fitting 18 located at a tavern or other place where the beer is to be tapped and used.

While there are different kinds of keg fitting, FIG. 1 shows one such type and is generally representative of others that are in use. This invention can be used with any conventional keg fitting of the "two-prong type".

The keg fitting 16 consists essentially of a cylindrical sleeve 20 which passes through the opening 12 and which preferably fits snugly in the opening 12. At the lower end of the sleever 20, the keg fitting 16 is of larger diameter and includes a portion 22 which may be of one-piece construction with the sleeve 20 or may be connected to it by a screw connection at the lower end of the sleeve, or in any other suitable manner. The larger portion 22 has a diameter greater than the diameter of the opening 12 and it is firmly connected with and a unitary part of the sleeve 20.

The larger portion 22 of the keg fitting is held against the inside surface of the side 10 of the beer keg. A sealing washer 24 is compressed between the upper end of the portion 22 and wall of the keg to prevent leakage of liquid or gas between the beer keg fitting and the inside surface of the opening 12.

The large diameter portion 22 of the beer keg fitting is held up against the inside surface of the keg wall 10 by a nut 26 threaded over the upper end of the sleeve 20 and pressing against the flange 14 with a washer 28 between the confronting surfaces of the nut 26 and the flange 14. The nut 26 is screwed down as far as necessary to make the keg fitting tight in the keg and the nut 26 is then locked against rotation by a set screw or in any other suitable manner.

There is a liquid opening 32 and a gas opening 34 through the keg fitting 16. These openings 32 and 34 are parallel and they are eccentric with respect to the axis of the keg opening 12 and the nut 26. The liquid opening 32 has a check valve 38 for preventing outflow of liquid from the keg. Only a portion of this check valve 38 is shown in FIG. 1; but it should be understood that this check valve is held closed except when the hose connector fitting 18 is inserted into the openings 32 and 34, as will be hereinafter explained.

The construction thus far described is a conventional construction and is not a part of the present invention. However its illustration and a description of it to the extent illustrated is necessary for an understanding of the way in which the present invention operates and the type of tapping equipment with which it is used.

This invention is an improved hose connector system for use with two-prong tapping equipment. The hose connector fitting 18 has a body portion 40 with a shoulder 42 surrounded by a nut 44 with a flange 46 overlying the shoulder 42.

The nut 44 has threads 48 which screw over complementary threads on the circumferential surface of the keg fitting 16. In the illustrated construction, these complementary threads are on the outside of the nut 26 which locks the keg fitting in position on the keg.

As the nut 44 is screwed down along its threads 48, a bottom face 50 of the hose connector fitting 18 is brought into contact with a complementary top face of the sleeve 20 of the keg fitting. Sealing washer 52 is located in counterbores in the bottom surface of the face 50 to seal the space between the face 50 and the complementary face of the keg fitting 16.

The nut 44 has handle portion 54 by which it can be rotated manually to screw onto or off of the keg fitting when changing from one keg to another. In the construction illustrated, the shoulder 42 is a ring extending from a circumferential groove 56 around a cylindrical part of the body portion 40. The illustrated construction has the body portion 40 cylindrical around its entire height and while this is not essential, it is necessary that the nut 44 have a cylindrical inside surface for the threads 48 and for the flange 46 so as to overlap the shoulder 42.

A prong 58 for the liquid passage 32 and a prong 60 for the gas passage 34 extend downward from the body portion 40 and are securely held in counterbores in passages 62 and 64 which are extensions of the liquid passages 32 and gas passages 34, respectively. The prongs 58 and 60 can be secured to the body 40 by press fits into the counterbores of the passages 62 and 64, or they can be soldered to the body 40 or held in rigid relation with the body 40 by any other suitable attaching means. The prong 58 is long enough to press the check valve 38 down and hold it in open position when the hose connector fitting 18 is attached to the keg fitting 16. In some keg fttings, the probe 60 also operates a check valve.

An upper portion 68, which is preferably of one-piece construction with the body portion 40, extends upward from the body portion 40 and is preferably cylindrical with the axis of the cylinder coincident with the axis of the liquid passage 62. There is a counterbore 70 at the upper end of the passage 62, and a frusto-conical shoulder 72 at the end of the counterbore 70. This shoulder 72 serves as a seat for a ball valve 74.

A hose nipple 76 has an end flange 78 which bears against the upper end of the portion 68 of the hose connector fitting 18. A flanged nut 80 extends over the flange 78 and clamps the flange 78 to the upper portion 68 with a sealing washer 82 between the confronting faces of the upper portion 68 and nipple flange 78. The nut 80 screws down along threads 86 on the outside of the upper portion 68. Thus the nut 80 connects the hose nipple 76 rigidly against the upper portion 68 of the hose connector fitting 18.

The outside surface of the upper portion 68 is preferably cylindrical and concentric with the passage 62 so that the hose nipple 76 is held in alignment with the passage 72.

Because of the fact that the liquid passage 62 is not concentric with the axis of the body 40, it will be observed that the upper portion 68 is located in an eccentric position with respect to the axis of the body 40 of the hose connector fitting.

In order to prevent the check valve 74 from being carried out of the fitting 18 and into the hose nipple 76, there is a retainer 90 located in the counterbore 70 and preferably held in place by threads 92 on the outside of the retainer 90 and in position to engage complementary threads on the side wall of the counterbore 70. The retainer 90 is screwed down toward the shoulder 72 to the extent necessary to prevent the check valve 74 from rising further than desired from the shoulder or seat 72.

FIGS. 4 and 5 show the retainer 90 in greater detail. In order to be able to rotate the retainer to screw it up and down in the counterbore 70, there is a hexagonal opening 96 in the upper end of the retainer 90 for receiving a wrench by which the retainer can be rotated. A bottom surface 97 of the retainer 90 has two downwardly extending projections 98 with sloping faces 99 for contact with the check valve so that the check valve cannot move upwardly into the opening through the retainer far enough to block upward flow of liquid through the retainer 90. It should be kept in mind that the check valve with which the retainer 90 is used functions as a check valve to prevent flow of liquid downwardly from the hose nipple 76 (FIG. 1) so that when changing kegs, liquid from the distributing system will not flow back through the hose connector fitting 18 and spill out on the floor from the probe 58. The check valve 74 is never called upon to prevent the flow of beer or other liquid upward through the fitting 18 and into the nipple 76 and liquid distributing hose that is connected with this nipple.

FIG. 2 shows the gas passage 64 extending upwardly in the body 40 and dividing into two counterbores 102 and 104 which are preferably threaded. A gas hose nipple 106 has a threaded end 108 which screws into counterbore 102 with a sealing ring 110 compressed against the body 40 by a shoulder 112 on the nipple 106.

A pressure relief valve 120 has a valve element 122 held against a valve seat 124 by a bellows spring 126. This relief valve 120 has a threaded end portion 130 which screws into the counterbore 104 with a sealing washer 132 compressed against the body 40 by a shoulder 134 on the housing of the relief valve 120.

The relief valve 120 is merely representative of valve means for opening to release excessive pressure from the gas pressure 64 and there is a check valve 140 in the base of the nipple 106 which is not a part of the present invention; but is describd and claimed in a separate application.

FIGS. 1A through 1D show the improved construction of the liquid passage probe 58. The gas passage probe 60 is preferably constructed in the same way but no illustration of this is necessary since the only difference from FIGS. 1A through 1D is in the diameter of the probe.

The probe 58 is made from a piece of bar stock 158 which is cut to the desired length of the probe 58. This cut length of bar stock 158 is then placed in a machine and rotated about an axis 160, shown in FIG. 1B. The tool of the cutting machine cuts away the bar stock from the right and inwardly to a surface 162 which is a partially cylindrical surface with the axis 160 as its center of curvature.

The cutting operation about the center 160 removes metal from the bar stock up to a shoulder 164. The bar stock is then cut away along a plane 166 extending at an acute angle to the axis 168 of the bar stock 158.

As shown in FIG. 1B, the cylindrical surface 162 cooperates with the bar stock surface 170, located to the left of the surface 162 in FIG. 1B, to form a lower end portion 172 which is of generally elliptical cross section, though with abrupt changes in shape at the lines where the surface 162 intersects the surface 170.

In the construction shown in FIG. 1B, the cylindrical surface 162 extends beyond the bar stock axis 168 so that the cross section of the lower end portion 172 has a maximum width greater than the radius of the bar stock 158. This provides a strong lower end portion 172 for the probe 58, and a construction that is not easily damaged when the hose connection fitting is being transferred from one keg fitting to another.

The next operation in the manufacture of the probe 58 is the drilling of the bar stock along the axis 168 from the upper end of the bar stock. The drill used has a diameter indicated by the dimension arrow 174 in FIG. 1C. The selection of the drill size depends upon the thickness of the wall desired in the finished probe. For example, with bar stock having a diameter of 0.31 inch, and a drill size of one-quarter inch, the tube wall will be 0.03 inch thick. These figures are given merely by way of illustration.

As the drill progresses down the length of the bar stock, it eventually breaks through the plane surface 166 to form an opening in the plane surface 166 which is inward from the stock which forms the walls of the passage through which the drill is advancing.

When the drill point reaches the level of the flat face 164, it continues to advance into solid metal because the lower end portion 172 extends beyond the axis 168 along which the drill point is advancing.

The drill is preferably advanced downward in the bar stock until the full diameter of the drill reaches the level of the flat face 164. This causes the drill point to advance to the location indicated by the referance character 176 in FIG. 1C and it causes the drill to cut a recess 178 in the upper part of the lower end portion 172 which is in line with the passage cut by the drill. This makes the opening which is cut through the surface 166 extend also to some extent below the level of the flat face 164 and partially into the right hand side of the upper end of the lower end portion 172 as indicated in FIG. 1C and as shown clearly in front view in FIG. 3.

FIG. 1D is a sectional view showing a bottom view of the opening in the front of the probe 58; the opening being designated by the referance character 180. The actual cross section of the opening 180, when viewed from the front, is illustrated in FIG. 3. This opening 180 preferably has a cross section at least as great as the passage through the probe 58 which is formed by the drill; and thus the opening 180 does not obstruct the flow of liquid into the probe.

It will be apparent from FIGS. 1C and 1D that the lower end portion 172 of the probe 58 has much larger cross section and greater strength than would be obtaind if the probe were made of tubing and merely cut off across a transverse plane such as the surface 166 to leave a lower end portion for operating a check valve in the keg fitting.

FIG. 6 is a detailed view of the preferred construction for the shoulder 42 (FIG. 1) which permits the nut 44 to force the hose connection fitting downward on the keg fitting. This shoulder 42 is made as a ring 190 formed of flattened convolutions which contact with one another in a fashion similar to the common "kew ring". The convolutions of the ring 190 are spread apart in FIG. 6 for clearer illustration but they are tensioned so as to normally remain in contact with one another.

The ring 190 is conveniently inserted into the groove, as shown in FIG. 1, by spreading the convolutions slightly and then introducing one end of the ring into the groove and turning the ring so as to feed the entire circumferential length of the ring into the groove in the body portion 40.

The preferred embodiment of the invention has been illustrated and described, and some features can be used in different combinations without departing from the invention as described in the claims.

We claim:

1. The method of making a hose connecton fitting of a beer keg keg tapping apparatus which has a probe for opening a check valve in a keg fitting, which method comprises taking a length of bar stock which is separate from the apparatus with which it is to be used but equal to the length of the desired probe, said bar stock when vertically oriented with respect to its longitudinal axis having a top and bottom located at the ends of the bar stock and a front surface extending along the length of the bar stock, said front surface having an upper end and a lower end portion adjacent said top and bottom, respectively, rotating the bar stock, in a cutting machine, about an axis which is eccentric of the axis of the bar stock, cutting away a portion of material from the lower front end portion of the bar stock during such rotation to form a lower end portion of the probe located mostly on one side of the longitudinal axis of the bar stock to serve as a check valve-operating abutment at the lower end of the probe, cutting away other material from the front end of the bar stock, above said lower end portion, and at an angle to the longitudinal axis of the bar stock to form a sloping surface extending from a point on the front of the bar stock to a location adjacent to the upper end of said lower end portion, and drilling downward from the top of the bar stock until the drill breaks through said sloping surface and forms an opening through the front of the probe, stopping the drilling before the drill reaches the bottom end of said lower end portion, and inserting the upper end of the probe into the lower end of a liquid passage in the hose connection fitting and in alignment with said liquid passage.

2. The method described in claim 1 characterized by shaping the lower end portion of the probe by forming a cylindrical surface at the front of said lower end portion with a radius of curvature of said cylindrical surface greater than the radius of the bar stock.

3. The method described in claim 1 characterized by removing part of the front of the bar stock above said lower end portion and at an angle to the longitudinal axis of the bar stock to form a sloping plane surface extending from a point on the front of the bar stock to a location adjacent to the upper end of said lower end portion at the widest part of said lower end portion.

4. The method described in claim 1 characterized by continuing the drilling of the bar stock with a drill of a diameter less than the diameter of the bar stock and until the full diameter of the drill reaches the level of the upper end of said lower end portion, and leaving the lower end portion as a wall of one-piece construction with the rest of the probe and extending across a substantial part of the cross section of the tube formed by the drilling of the bar stock.

* * * * *